United States Patent
Gore et al.

(10) Patent No.: US 11,341,246 B2
(45) Date of Patent: May 24, 2022

(54) SECURE FIRMWARE UPDATE FOR DEVICE WITH LOW COMPUTING POWER

(71) Applicant: Dell Products L.P., Round Rock, TX (US)

(72) Inventors: Santosh Gore, Bangalore (IN); Raveendra Babu Madala, Bangalore (IN); Viswanath Ponnuru, Bangalore (IN); Deepu Syam Sreedhar M, Calicut (IN); Sura Rajashekar Reddy, Andhra Pradesh (IN)

(73) Assignee: Dell Products L.P., Round Rock, TX (US)

( * ) Notice: Subject to any disclaimer, the term of this patent is extended or adjusted under 35 U.S.C. 154(b) by 1 day.

(21) Appl. No.: 16/549,113

(22) Filed: Aug. 23, 2019

(65) Prior Publication Data

US 2021/0056208 A1 Feb. 25, 2021

(51) Int. Cl.
  *G06F 21/57* (2013.01)
  *H04L 9/32* (2006.01)
  *G06F 8/65* (2018.01)

(52) U.S. Cl.
  CPC .............. *G06F 21/572* (2013.01); *G06F 8/65* (2013.01); *H04L 9/3247* (2013.01); *G06F 2221/033* (2013.01)

(58) Field of Classification Search
  CPC ......... G06F 21/572; G06F 8/65; H04L 9/3247
  USPC ........................................................ 717/168
  See application file for complete search history.

(56) References Cited

U.S. PATENT DOCUMENTS

| | | | | |
|---|---|---|---|---|
| 8,874,922 B2* | 10/2014 | Jaber | ..................... | G06F 21/572 |
| | | | | 713/176 |
| 9,069,965 B2* | 6/2015 | Liles | ..................... | G06F 21/572 |
| 9,183,395 B2* | 11/2015 | Liles | ....................... | G06F 8/654 |
| 2008/0126784 A1* | 5/2008 | Lima | ................... | G06F 11/2094 |
| | | | | 713/2 |
| 2013/0185564 A1* | 7/2013 | Jaber | ..................... | G06F 21/572 |
| | | | | 713/176 |
| 2015/0278524 A1* | 10/2015 | Liles | ..................... | G06F 21/572 |
| | | | | 726/22 |
| 2017/0040057 A1* | 2/2017 | Cho | ......................... | G06F 13/16 |
| 2018/0145834 A1* | 5/2018 | Dharankar | .............. | H04L 63/06 |
| 2018/0176222 A1* | 6/2018 | Bhaskar | .............. | H04L 63/0815 |
| 2019/0042765 A1* | 2/2019 | Chung | .................... | G06F 21/78 |
| 2020/0382314 A1* | 12/2020 | Setteboun | ............. | H04L 9/3247 |

* cited by examiner

*Primary Examiner* — Lewis A Bullock, Jr.
*Assistant Examiner* — Theodore E Hebert
(74) *Attorney, Agent, or Firm* — Jackson Walker L.L.P.

(57) ABSTRACT

An information handling system may include a host system comprising a host system processor, a management controller coupled to the host system processor, and an information handling resource coupled to the host system processor and the management controller, the information handling resource including a firmware. The information handling system may be configured to transfer a firmware update package from the host system to the management controller, wherein the firmware update package includes a cryptographic signature; verify, at the management controller, the cryptographic signature; transfer data indicative of the verification from the management controller to the information handling resource; and in response to receiving the data indicative of the verification from the management controller, install, by the information handling resource, the firmware update package.

8 Claims, 6 Drawing Sheets

SECURE FIRMWARE UPDATE FOR DEVICE WITH LOW COMPUTING POWER

TECHNICAL FIELD

The present disclosure relates in general to information handling systems, and more particularly to systems and methods for updating firmware in information handling systems and information handling resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometimes subject to security vulnerabilities. For example, some types of security vulnerabilities may target flaws in the firmware of an information handling system or of some information handling resource that is a component thereof, and thus a need arises to update such firmware. Cryptographic signatures are sometimes used to verify the authenticity of a firmware update before it is applied. Depending on the type of signature, a significant amount of computing resources may be needed in order to verify the signature's authenticity.

In some instances, however, the firmware in question may be a component of an information handling resource that does not have sufficient computing power (e.g., processing power, memory, or a combination thereof) to verify the cryptographic signature. For example, it may not be possible for certain low-power devices to perform the calculations needed under certain cryptographic standards such as Federal Information Processing Standard (FIPS) 186-4.

Accordingly, a need has arisen for a way of verifying a signature prior to applying a firmware update to a device that cannot itself perform the verification. Embodiments of this disclosure provide techniques for using a management controller to securely verify such signatures.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with firmware updates in information handling systems and resources may be reduced or eliminated.

In accordance with embodiments of the present disclosure, an information handling system may include a host system comprising a host system processor, a management controller coupled to the host system processor, and an information handling resource coupled to the host system processor and the management controller, the information handling resource including a firmware. The information handling system may be configured to transfer a firmware update package from the host system to the management controller, wherein the firmware update package includes a cryptographic signature; verify, at the management controller, the cryptographic signature; transfer data indicative of the verification from the management controller to the information handling resource; and in response to receiving the data indicative of the verification from the management controller, install, by the information handling resource, the firmware update package.

In accordance with these and other embodiments of the present disclosure, a method may include transferring a firmware update package from a host system to a management controller of the host system, wherein the firmware update package includes a cryptographic signature; the management controller verifying the cryptographic signature; the management controller transferring data indicative of the verification to an information handling resource; and in response to receiving the data indicative of the verification from the management controller, the information handling resource installing the firmware update package.

In accordance with these and other embodiments of the present disclosure, an article of manufacture may include a non-transitory, computer-readable medium having computer-executable code thereon that is executable by a processor of an information handling system for: transferring a firmware update package from a host system of the information handling system to a management controller of the information handling system, wherein the firmware update package includes a cryptographic signature; the management controller verifying the cryptographic signature; the management controller transferring data indicative of the verification to an information handling resource; and in response to receiving the data indicative of the verification from the management controller, the information handling resource installing the firmware update package.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 6, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

Figure 1:
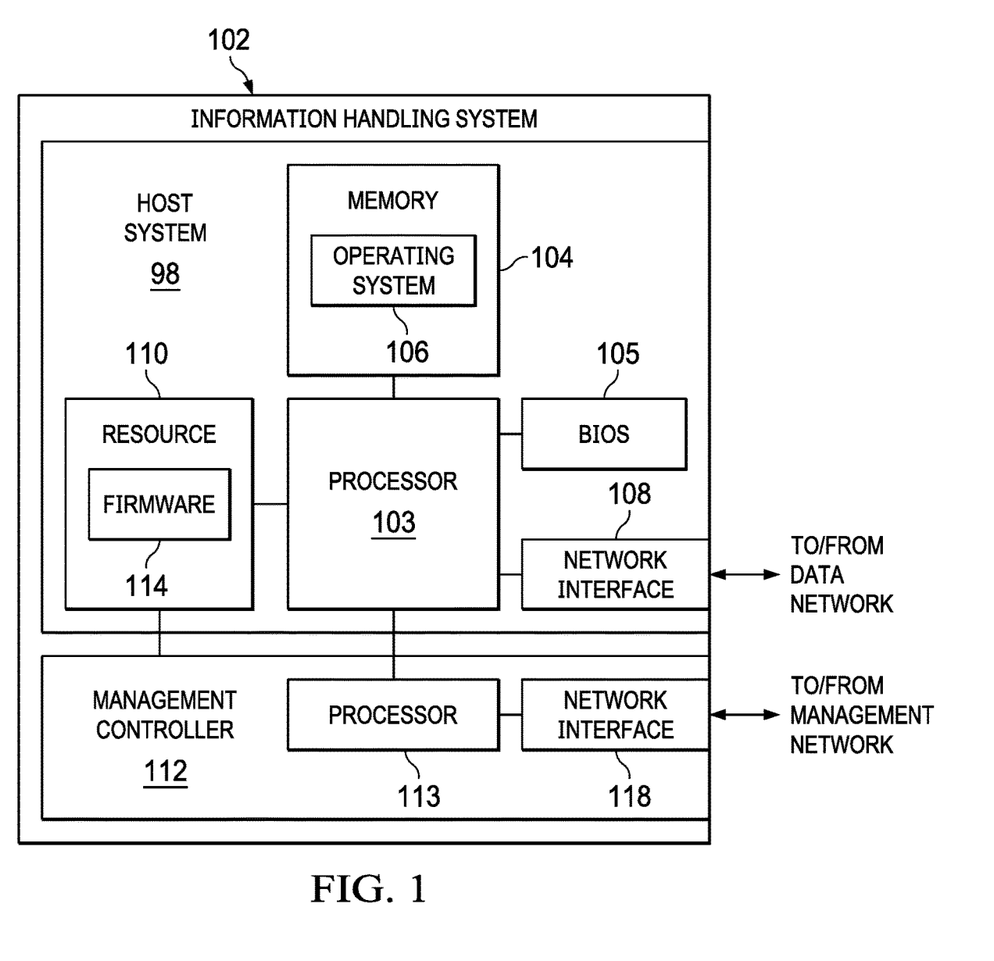
FIG. 1 illustrates a block diagram of an example information handling system, in accordance with embodiments of the present disclosure.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

Host system 98 may also include information handling resource 110, with may include firmware 114 therein. Information handling resource 110 may be coupled both to processor 103 (e.g., via a PCI interface, a PCIe interface, a USB interface, or any other suitable communications interface) and to management controller 112 (e.g., coupled to processor 113 of management controller 112 via an Inter-Integrated Circuit (I2C) bus or any other suitable communications interface). In some embodiments, information handling resource 110 may be of relatively low computing power. For example, information handling resource may include a processor and a memory that do not provide sufficient computing power to perform the calculations needed to verify cryptographic signatures.

As noted above, some embodiments of this disclosure may provide for relatively low-end devices to use a management controller for verifying the authenticity of a firmware update package while applying the firmware via an operating system that is executing on the host system. The management controller may verify the authenticity of the update package, and it may communicate that verification to the information handling resource in various ways.

In some embodiments, the firmware update package may include a text document (e.g., an XML document referred to herein as package.xml) that describes the contents of the package and may include cryptographic information.

Figure 2:
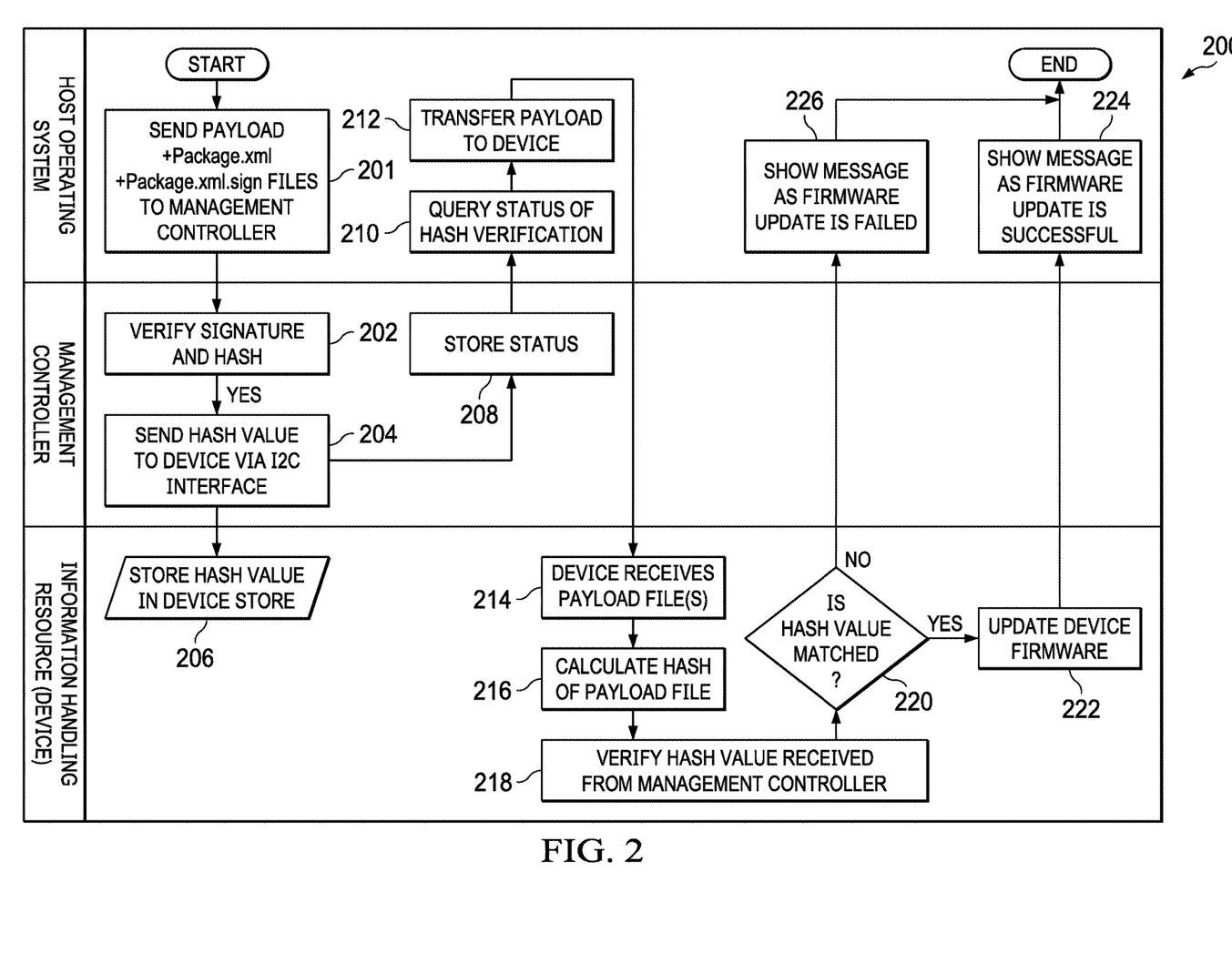
FIGS. 2-6 illustrate example flow diagrams of methods in accordance with embodiments of the present disclosure.

For example, the management controller may send a hash of the firmware payload to the information handling resource (e.g., via an I2C interface). This hash may be verified by the information handling resource computing its own hash and then comparing the two hashes. FIG. 2 provides a flow chart in accordance with this embodiment.

Figure 3:
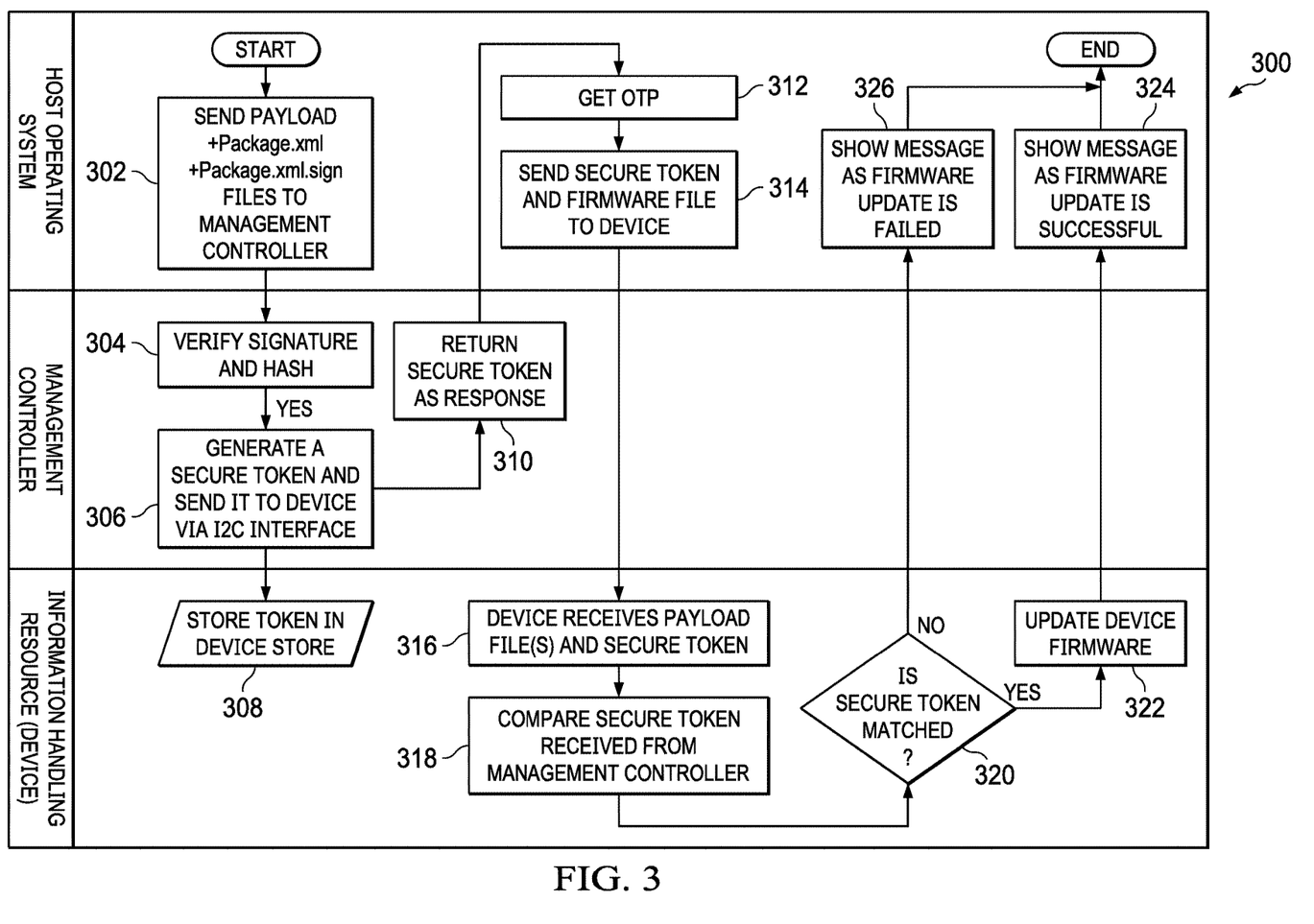

In other embodiments (e.g., when the information handling resource lacks even enough computing power to compute a hash), the management controller may send a secure token (e.g., a cryptographic token) to the information handling resource. The information handling resource may then compare that token to another token, without the need to compute a hash. FIG. 3 provides a flow chart in accordance with this embodiment.

Figure 4:
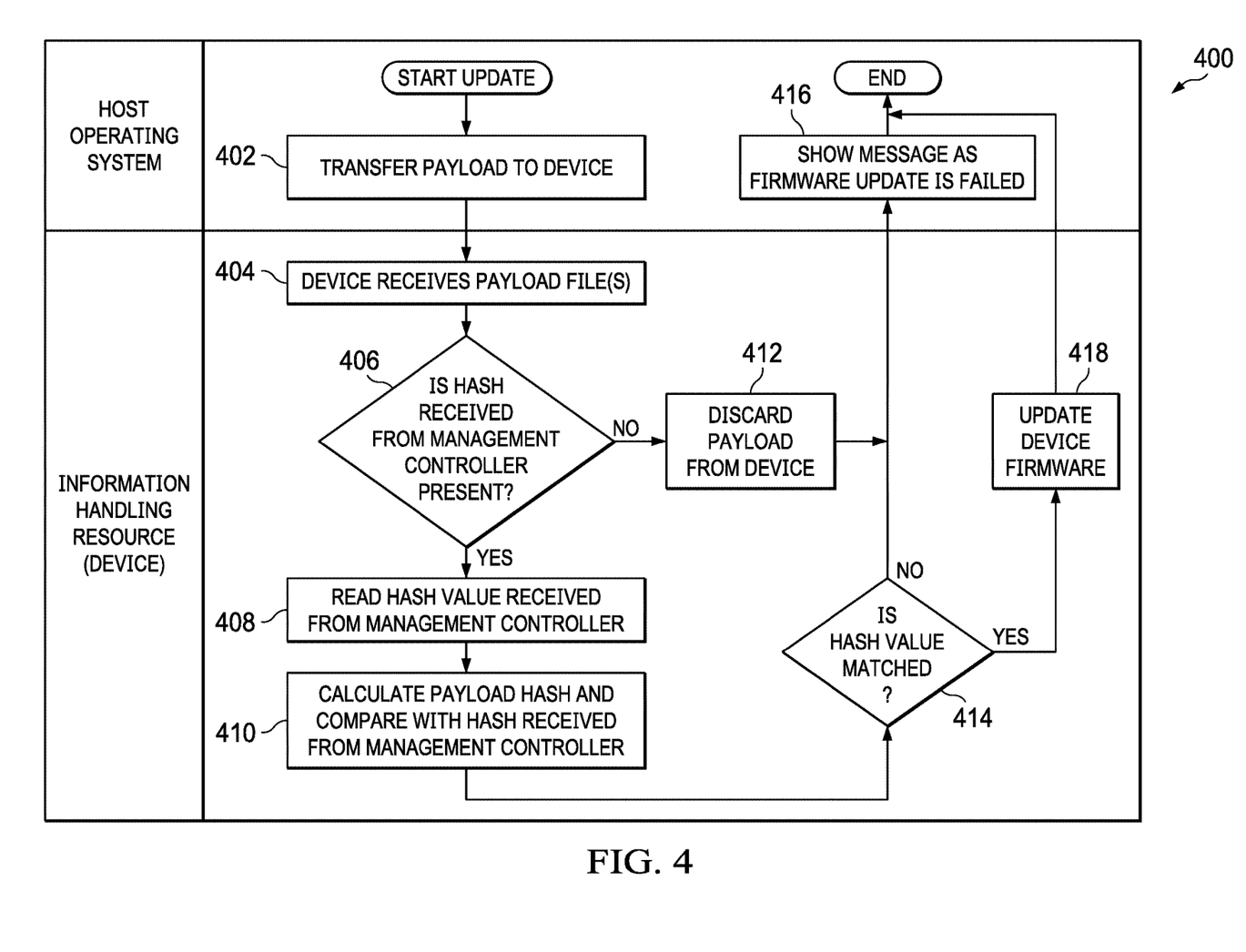

FIG. 4 provides a flow chart of an embodiment in which a malicious firmware is prevented from being installed. In some embodiments, this method may be extended to prevent unauthorized updates in a lockdown mode.

Figure 5:
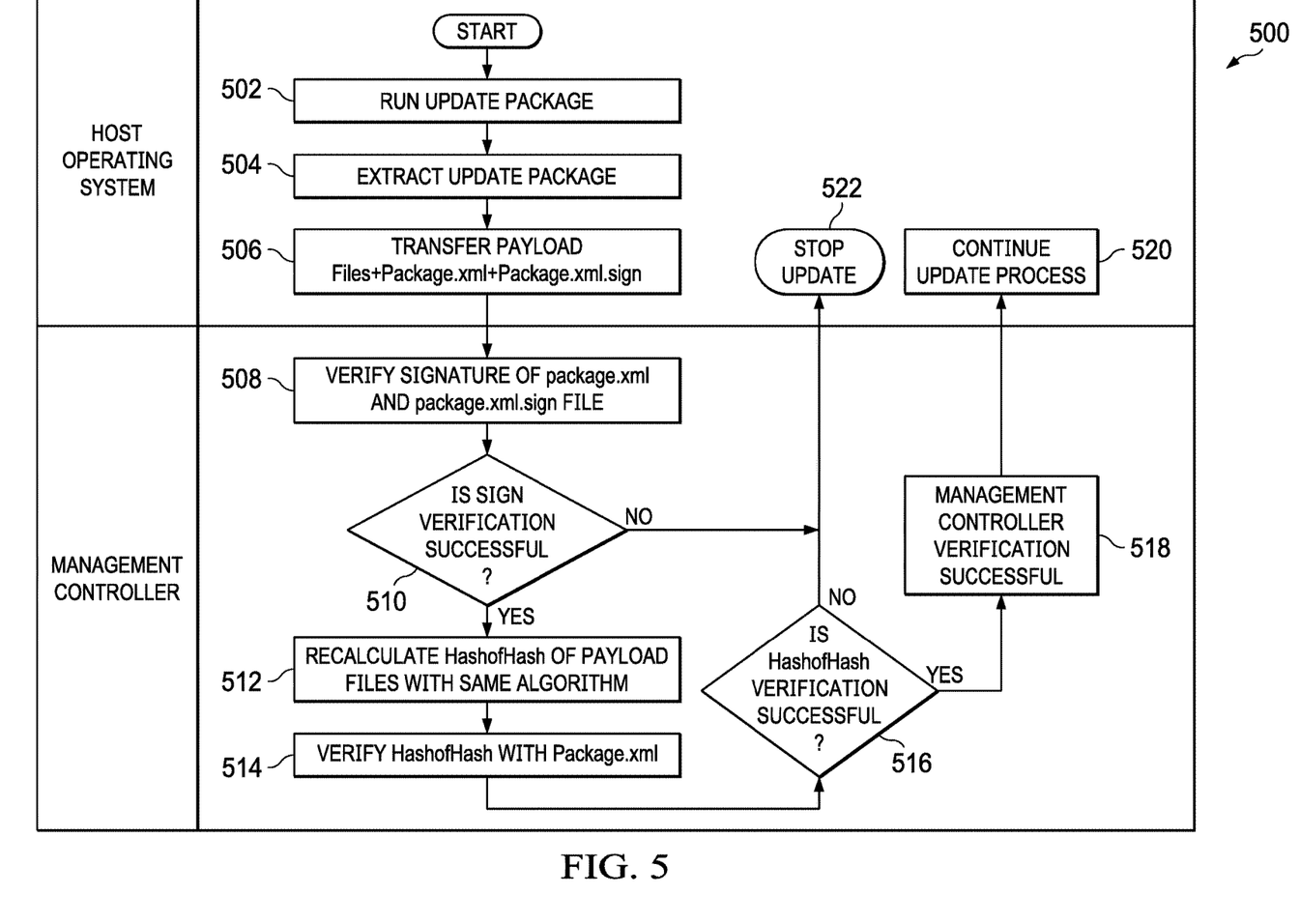
Figure 6:
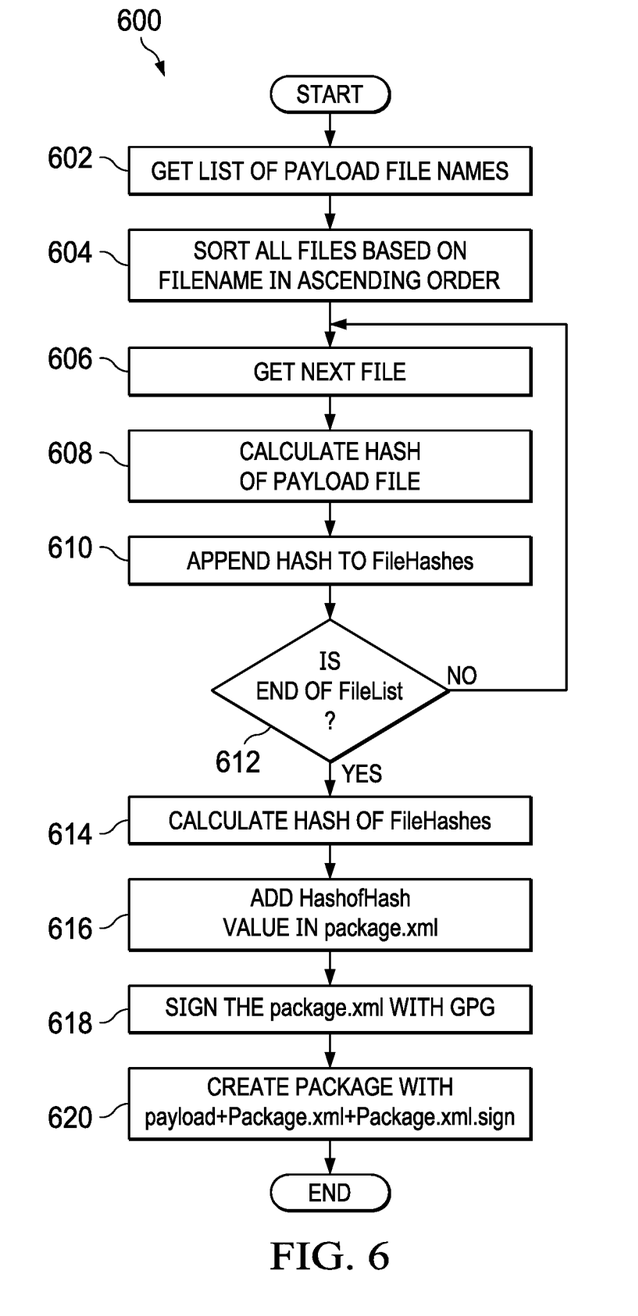

In some embodiments, a hash of the firmware payload files may be implemented as a hash of hashes provided in package.xml. FIG. 5 provides a flow chart for an embodiment of payload authenticity verification using the hash (e.g., a hash of hashes). FIG. 6 provides a flow chart for an embodiment of creating the hash of hashes.

Turning now to FIG. 2, a flow chart of an example method 200 for verifying authenticity via a hash is shown. In this example, a host system (e.g., host system 98 from FIG. 1) executes a host operating system. A management controller provides management functionality for the host system; an information handling resource (also referred to herein simply as a device) is in need of a firmware update.

At step 201, a firmware update package is transferred from the host operating system to the management controller. This package may include various components, such as the firmware update binary, a package.xml file as discussed above, and a package.xml.sign file including one or more cryptographic signatures (e.g., a cryptographic signature of the package.xml file).

At step 202, the management controller verifies the authenticity of the package files by verifying the signature of package.xml and the hash of hashes (discussed in more detail below with reference to FIG. 6).

At step 204, if the signature verification was successful, the management controller may send a hash of the package to the device (e.g., via an I2C interface). The device stores this hash value at step 206. In some embodiments, the device may store this value in volatile memory and in a way such that it is not accessible to the host system via any host interfaces. Further, at step 208, the management controller may store a status identifier indicating that the procedure was successful.

The host operating system (or a program executing thereunder) may detect at step 210 that the status identifier indicates successful completion, and the package may be transferred from the host to the device at step 212, and received by the device at step 214.

The device may calculate the hash of the received payload file at step 216, and verify at step 218 that this hash is equal to the hash that was received from the management controller.

If the hash values are not equal at step 220, a message may be displayed notifying a user that the firmware update has failed at step 226, and the method may end.

If the hash values are equal at step 220, however, the device may update its firmware at step 222, a message may be displayed notifying the user that the firmware update has succeeded at step 224, and the method may end.

Turning now to FIG. 3, a flow chart of an example method 300 for verifying authenticity via a secure token is shown. At step 302, a firmware update package is transferred from the host operating system to the management controller. This package may include various components, such as the firmware update binary, a package.xml file as discussed above, and a package.xml.sign file including one or more cryptographic signatures (e.g., a cryptographic signature of the package.xml file).

At step 304, the management controller verifies the authenticity of the package files by verifying the signature of package.xml and the hash of hashes (discussed in more detail below with reference to FIG. 6).

At step 306, if the signature verification was successful, the management controller creates a secure cryptographic token and sends it to the device (e.g., via an I2C interface). The device stores this secure token at step 308. In some embodiments, the device may store this value in volatile memory and in a manner such that it is not accessible to the host system via any host interfaces. Further, at step 310, the management controller may return the secure token to the host operating system as a response indicating that the procedure was successful. The host operating system may store this secure token as a one-time password (OTP) at step 312.

At step 314, the host operating system transfers the firmware update package and the secure token to the device, which receives these at step 316. At steps 318 and 320, the device compares the copy of the secure token received from the management controller with the copy received from the host operating system.

If the tokens are not equal, a message may be displayed notifying a user that the firmware update has failed at step 326, and the method may end.

If the tokens are equal, however, the device may update its firmware at step 322, a message may be displayed notifying the user that the firmware update has succeeded at step 324, and the method may end.

Turning now to FIG. 4, a flow chart of an example method 400 for preventing a malicious firmware from being installed is shown. Method 400 shows a process as it may take place between the host operating system and the information handling resource.

At step 402, a firmware update package is transferred from the host operating system to the device. The device receives the payload file(s) at step 404.

At step 406, the device determines whether it has received a hash from the management controller. If not, the firmware update package is discarded at step 412, a failure message is displayed at step 416, and the method ends.

If, on the other hand, the hash from the management controller is present, the device reads the hash at step 408. The device then calculates its own hash of the payload and compares it with the value received from the management controller.

At step 414, if the hash does not match, the method proceeds to step 416, a failure message is displayed, and the method ends.

If the hashes do match, however, the device proceeds to update its firmware at step 418, and the method ends successfully.

Turning now to FIG. 5, a flow chart of an example method 500 for payload authenticity verification using a hash (e.g., a hash of hashes) is shown. Method 500 shows the process as it may take place between the host operating system and the management controller.

At step 502, the host operating system runs a firmware update package, which extracts files at step 504. At step 506, the firmware update package (e.g., including the firmware update binary file(s), a package.xml file, and a package.xml.sign file) is transferred from the host operating system to the management controller.

At step 508, the management controller verifies the cryptographic signature(s) of the firmware update package. If the verification is unsuccessful at step 510, the method proceeds to step 522, and the update process is stopped.

If the verification is successful, however, the management controller proceeds at step 512 to recalculate the hash of hashes of the payload files (discussed in more detail below). In general, this hash may be calculated using the same algorithm regardless of which system is performing the calculation.

At step 514, the newly calculated hash of hashes is compared with the copy that is present in the firmware update package. If these values fail to match at step 516, the method proceeds to step 522, and the update process is stopped.

If the values do match, however, the verification is deemed successful at step 518, and the update process continues at step 520.

Turning now to FIG. 6, a flow chart of an example method 600 for creating a hash of hashes is shown. The hash generated via method 600 may be used in any of various embodiments described herein.

At step 602, a list is obtained of all of the files in a firmware update payload package. The files may then be sorted into ascending (or descending) order based on their filenames at step 604, so that repeated calculations of the hash do not depend on file order.

At steps 606, 608, 610, and 612, a loop is entered that determines a hash for every file in the list of files, and the hashes are all appended together. Any suitable hashing function may be used, such as MD5, SHA, etc.

Once all of the files have been processed in this loop, the result is the ordered concatenation of all of the hashes of all of the files. At step 614, a hash is calculated based on this result, generating a hash of hashes.

The value determined at step 614 is added to package.xml at step 616. At step 618, the updated package.xml may be cryptographically signed. Any suitable signature procedure may be employed, for example, GPG.

Finally, at step 620, an executable update package is generated, including the payload, the package.xml file, and the package.xml.sign file. The method then ends.

One of ordinary skill in the art with the benefit of this disclosure will understand that the preferred initialization point for the methods depicted in FIGS. 2-6 and the order of the steps comprising those methods may depend on the implementation chosen. In these and other embodiments, this method may be implemented as hardware, firmware, software, applications, functions, libraries, or other instructions. Further, although FIGS. 2-6 disclose a particular number of steps to be taken with respect to the disclosed methods, the methods may be executed with greater or fewer steps than those depicted. The methods may be implemented using any of the various components disclosed herein (such as the components of FIG. 1), and/or any other system operable to implement the method.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   a host system comprising a host system processor;
   a management controller coupled to the host system processor; and
   an information handling resource coupled to the host system processor and the management controller, the information handling resource including a firmware, an onboard processor, and an onboard memory having a size;
   wherein the information handling system is configured to:
      transfer a firmware update package from the host system to the management controller, wherein the firmware update package includes a cryptographic signature;
      verify, at the management controller, the cryptographic signature, wherein the verification of the cryptographic signature uses a process that requires at least a minimum amount of memory that is greater than the size of the onboard memory of the information handling resource, such that the onboard processor and the onboard memory of the information handling resource are not capable of verifying the cryptographic signature;
      transfer data indicative of the verification from the management controller to the information handling resource, wherein the data indicative of the verification comprises a cryptographic token, and wherein the cryptographic token is stored at the information handling resource in storage that is inaccessible to the host system;
      transfer the cryptographic token from the management controller to the host system;
      transfer the firmware update package and the cryptographic token from the host system to the information handling resource;
      compare, by the information handling resource, the cryptographic token received from the management controller and the cryptographic token received from the host system; and
      in response to a match between the cryptographic token received from the management controller and the cryptographic token received from the host system, install, by the information handling resource, the firmware update package.

2. The information handling system of claim 1, wherein the cryptographic signature complies with a cryptographic standard.

3. The information handling system of claim 2, wherein the cryptographic standard is Federal Information Processing Standards (FIPS) 186-4.

4. A method comprising:
   transferring a firmware update package from a host system to a management controller of the host system, wherein the firmware update package includes a cryptographic signature;
   the management controller verifying the cryptographic signature;
   the management controller transferring data indicative of the verification to an information handling resource, wherein the information handling resource includes an onboard processor and an onboard memory that has a size, and wherein the verification of the cryptographic signature uses a process that requires at least a minimum amount of memory that is greater than the size of the onboard memory of the information handling resource, such that the onboard processor and the onboard memory of the information handling resource are not capable of verifying the signature, wherein the data indicative of the verification comprises a cryptographic token, and wherein the cryptographic token is stored at the information handling resource in storage that is inaccessible to the host system;
   transferring the cryptographic token from the management controller to the host system;
   transferring the firmware update package and the cryptographic token from the host system to the information handling resource;
   comparing, by the information handling resource, the cryptographic token received from the management controller and the cryptographic token received from the host system; and
   in response to a match between the cryptographic token received from the management controller and the cryptographic token received from the host system, information handling resource installing the firmware update package.

5. The method of claim 4, wherein the data indicative of the verification is sent from the management controller to the information handling resource via an Inter-Integrated Circuit (I2C) bus.

6. An article of manufacture comprising a non-transitory, computer-readable medium having computer-executable code thereon that is executable by a processor of an information handling system for:

transferring a firmware update package from a host system of the information handling system to a management controller of the information handling system, wherein the firmware update package includes a cryptographic signature;

the management controller verifying the cryptographic signature;

the management controller transferring data indicative of the verification to an information handling resource, wherein the information handling resource includes an onboard processor and an onboard memory that has a size, and wherein the verification of the cryptographic signature uses a process that requires at least a minimum amount of memory that is greater than the size of the onboard memory of the information handling resource, such that the onboard processor and the onboard memory of the information handling resource are not capable of verifying the signature, wherein the data indicative of the verification comprises a cryptographic token, and wherein the cryptographic token is stored at the information handling resource in storage that is inaccessible to the host system;

transferring the cryptographic token from the management controller to the host system;

transferring the firmware update package and the cryptographic token from the host system to the information handling resource;

comparing, by the information handling resource, the cryptographic token received from the management controller and the cryptographic token received from the host system; and     in response to a match between the cryptographic token received from the management controller and the cryptographic token received from the host system, the information handling resource installing the firmware update package.

7. The article of claim 6, wherein the cryptographic signature complies with a cryptographic standard.

8. The article of claim 7, wherein the cryptographic standard is Federal Information Processing Standards (FIPS) 186-4.

\* \* \* \* \*